United States Patent
Jones, IV et al.

(10) Patent No.: US 7,342,872 B1
(45) Date of Patent: Mar. 11, 2008

(54) DIFFERENTIAL OFDM USING MULTIPLE RECEIVER ANTENNAS

(75) Inventors: Vincent K. Jones, IV, Redwood Shores, CA (US); James M. Gardner, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 849 days.

(21) Appl. No.: 10/673,958

(22) Filed: Sep. 29, 2003

Related U.S. Application Data (62) Division of application No. 09/282,589, filed on Mar. 31, 1999, now Pat. No. 6,654,340.

(51) Int. Cl.
*H04J 11/00* (2006.01)

(52) U.S. Cl. .................. 370/208; 375/283

(58) Field of Classification Search ........... 370/208, 370/209, 210, 320, 335, 342, 441; 375/283, 375/279, 233; 714/755
See application file for complete search history.

(56) References Cited

U.S. PATENT DOCUMENTS

| | | | |
|---|---|---|---|
| 5,282,222 A | 1/1994 | Fattouche et al. ............ 375/1 |
| 5,528,581 A | 6/1996 | De Bot ....................... 370/203 |
| 5,550,812 A | 8/1996 | Philips ....................... 370/203 |
| 5,761,190 A | 6/1998 | Yamauchi et al. ......... 370/210 |
| 5,838,799 A | 11/1998 | Cioffi et al. .................... 381/2 |
| 5,914,931 A | 6/1999 | Kang et al. ................ 370/203 |
| 5,949,793 A | 9/1999 | Bossard et al. ............ 370/487 |
| 5,959,965 A | 9/1999 | Ohkubo et al. ............ 370/203 |
| 6,327,314 B1 | 12/2001 | Cimini, Jr. et al. ........ 375/340 |
| 6,421,400 B1 * | 7/2002 | Rhee et al. ................. 375/329 |
| 6,499,128 B1 * | 12/2002 | Gerlach et al. ............ 714/755 |
| 7,103,107 B2 * | 9/2006 | Matsunaga et al. ........ 375/262 |

OTHER PUBLICATIONS

Jones et al., "Improved System for Interference Cancellation", Mar. 1999, U.S. Appl. No. 09/282,589.
Rohling et al., "Differential Amplitude Phase Shift Key (DAPSK)—A New Modulation Method for DTVB", Sep. 14-18, 1995, IEEE International Broadcasting Convention, pp. 102-108.
John G. Proakis, "Digital Communications", 3rd Edition, Ch. 5: Optimum Receivers for the Additive White Gaussian Noise Channel, pp. 274-278.

* cited by examiner

*Primary Examiner*—Chi Pham
*Assistant Examiner*—Alexander O. Boakye
(74) *Attorney, Agent, or Firm*—Dov Rosenfeld; Inventek (57) ABSTRACT

Systems and methods for optimally receiving differential encoded OFDM signals via multiple antennas. These techniques may exploit spatial diversity without knowledge of channel characteristics. Further systems and methods are provided for exploiting frequency diversity within an OFDM burst where differentially encoded symbols are repeated to assure optimal performance. The output of differential decoding systems may also be used to provide soft decision values for individual bits of multibit symbols to facilitate use of bitwise channel decoding systems.

5 Claims, 5 Drawing Sheets

DIFFERENTIAL OFDM USING MULTIPLE RECEIVER ANTENNAS

CROSS-REFERENCE TO RELATED APPLICATIONS

The present application is a divisional of and claims the benefit of priority from U.S. patent application Ser. No. 09/282,589, filed Mar. 31, 1999, which is incorporated herein by reference in its entirety.

BACKGROUND OF THE INVENTION

The present invention relates to data communication and more particularly to data communication over substantially orthogonal frequency channels.

Orthogonal frequency division multiplexing (OFDM) systems offer significant advantages in many real-world communication systems, particularly in environments where multipath effects impair performance. OFDM divides the available spectrum within a channel into narrow subchannels. In a given so-called "burst", each subchannel transmits one data symbol. Each subchannel, therefore operates at a very low data rate compared to the channel as a whole. To achieve transmission in orthogonal subchannels, a burst of frequency domain symbols are converted to the time domain by an IFFT procedure. To assure that orthogonality is maintained in dispersive channels, a cyclic prefix is added to the resulting time domain sequence. The cyclic prefix is a duplicate of the last portion of the time domain sequence that is appended to its beginning. To assure orthogonality, the cyclic prefix should be as long as the duration of the impulse response of the channel.

To maximize the performance of an OFDM system, it is desirable that the response of the channel be known at the receiver end of the link. To provide the receiver with knowledge of the channel response, the transmitter typically includes training symbols as part of the frequency domain sequence. The training symbols have known values when transmitted and their values as received indicate the channel response. The number of training symbols should generally be greater than the length of the duration of the impulse response of the channel.

The use of training symbols or transmission of channel response information as data takes away from the data carrying capacity of the link. Furthermore, the number of symbols used for training in a given burst does not decrease when smaller bursts must be used, e.g., to reduce latency for voice traffic or decrease sensitivity to phase noise. For systems that employ short bursts, the efficiency loss due to training is even greater.

The discussion up until now has assumed a point to point link. However, the loss of data carrying capacity due to channel training is greatly compounded in point to multipoint systems where channel capacity is shared among many nodes. In a point to multipoint system, the channel response is different for every combination of access point and remote station. Each separate channel response must be learned, representing a great loss of efficiency.

One way of using OFDM in dispersive channels without the use of channel training is to apply differential coding or modulation to the frequency domain symbols. Such a differential scheme encodes data as phase differences between frequency domain symbols. Channel magnitude response thus does not corrupt data transmission because the receiver system does not take received magnitude into account in estimating the transmitted data. Phase magnitude response also does not corrupt data transmission because any phase difference applied by the channel is effectively subtracted out as a part of the differential decoding process.

Another useful communication technique is the use of multiple reception antennas. The resulting spatial diversity may be exploited to ameliorate the effects of interference. IMPROVED SYSTEM FOR INTERFERENCE CANCELLATION, U.S. application Ser. No. 09/234,629, filed on Jan. 21, 1999, the contents of which are herein incorporated by reference, discloses the application of spatial diversity to an OFDM system to ameliorate interference. The techniques disclosed there are heavily reliant on knowledge of channel characteristics. It would be highly desirable to optimally combine input from multiple antennas without knowledge of channel characteristics.

SUMMARY OF THE INVENTION

Systems and methods for optimally receiving differential encoded OFDM signals via multiple antennas are provided by virtue of the present invention. These techniques may optimally exploit spatial diversity without knowledge of channel characteristics. The present invention further provides systems and methods for exploiting frequency diversity within an OFDM burst where differentially encoded symbols are repeated to assure optimal performance. The output of differential decoding systems may also be used to provide soft decision values for individual bits of multibit symbols to facilitate use of bitwise channel decoding systems.

According to a first aspect of the present invention, a system for receiving OFDM signals via multiple outputs of a channel includes: a plurality of transform processors, each transform processor converting time domain symbols received via one of the channel outputs to frequency domain symbols, a plurality of differential processors, each differential processor obtaining frequency domain symbols from one of the plurality of transform processors and removing differential encoding or modulation from the frequency domain symbols.

According to a second aspect of the present invention, a system for transmitting OFDM signals via a a channel includes: a differential processor that differentially encodes frequency domain symbols to be transmitted, and a transform processor that transforms bursts of the frequency domain symbols into bursts of time domain symbols wherein at least selected ones of the frequency domain symbols are repeated within the bursts.

According to a third aspect of the present invention, a system for receiving OFDM signals via a channel including: a transform processor that transforms a burst of time domain symbols into a burst of frequency domain symbols, and a plurality of differential processors, each of the differential processors obtaining as input frequency domain symbols from a corresponding segment of the burst, the differential processors differentially decoding the frequency domain symbols.

A further understanding of the nature and advantages of the inventions herein may be realized by reference to the remaining portions of the specification and the attached drawings.

DESCRIPTION OF SPECIFIC EMBODIMENTS

OFDM Communications

In one embodiment, the present invention may be implemented in the context of an OFDM communication system. The abbreviation "OFDM" refers to Orthogonal Frequency Division Multiplexing. In OFDM, the available bandwidth is effectively divided into a plurality of subchannels that are orthogonal in the frequency domain. During a given symbol period, the transmitter transmits a symbol in each subchannel. To create the transmitted time domain signal corresponding to all of the subchannels, an FFT is applied to a series of frequency domain symbols to be simultaneously transmitted, a "burst." The resulting series of time domain symbols is augmented with a cyclic prefix prior to transmission. The cyclic prefix addition process can be characterized by the expression:

$$[z(1) \ldots z(N)]^T \mapsto [z(N-v+1) \ldots z(N) \ z(1) \ldots z(N)]^T$$

On the receive end, the cyclic prefix is removed from the received time domain symbols. An IFFT is then applied to recover the simultaneously transmitted frequency domain symbols. The cyclic prefix has length v where v is greater than or equal to a duration of the impulse response of the channel and assures orthogonality of the frequency domain subchannels.

There are other ways of creating transmitted bursts of symbols in orthogonal channels or substantially orthogonal channels including, e.g., use of the Hilbert transform, use of the wavelet transform, using a batch of frequency upconverters in combination with a filter bank, etc. Wherever the term OFDM is used, it will be understood that this term includes all alternative methods of simultaneously communicating a burst of symbols in orthogonal or substantially orthogonal subchannels defined by procedures performed on a time domain sequence. The term frequency domain should be understood to refer to any domain that is divided into such orthogonal or substantially orthogonal subchannels.

Differential OFDM

Phase differences between complex frequency domain OFDM symbols may be used to communicate data. For example, consider a constellation of possible symbols that consists of four symbols all having the same magnitude and four equally distributed phases, $\pi/4$, $3\pi/4$, $5\pi/4$, and $7\pi/4$. There are four possible phase differences between symbols of a pair, $0$, $\pi$, $-\pi/2$, and $7\pi/2$. Thus successive pairings of symbols communicate 2 bits of data in such a system. In one representative type of differential OFDM system, data is communicated as phase differences between corresponding frequency domain symbols of successive bursts. In another representative type of differential OFDM system, data is communicated as phase differences between successive frequency domain symbols within the same burst. These are merely exemplary, and the present invention may be applied to processing phase differences between any set of pairs of frequency domain symbols.

The present invention also contemplates application to Differential Amplitude and Phase Shift Keying (DAPSK) systems. In a DAPSK system, the transmitted symbol constellation consists of two or more concentric PSK rings. Two or more bits are communicated by the phase differences between corresponding symbols of successive bursts. At least one bit is communicated by the amplitude differences or ratios between corresponding symbols of successive bursts. A DAPSK system is disclosed in Rohling et al., "Differential Amplitude Phase Shift Keying—A New Modulation Method for DTVB," International Broadcasting convention 14-18 Sep. 1995, (Conf. Pub. No. 713), the contents of which are herein incorporated by reference.

Differential OFDM is advantageous in that the data received does not depend on the characteristics of the channel. Consider differential data d(1) which is communicated by the phase difference between OFDM frequency domain symbols in bin 1 of successive bursts, z(1,1) and z(1,2) where z(n,k) is the data symbol transmitted in subchannel n in burst k. The OFDM frequency domain symbols recovered by the receiver will be x(1,1) and x(1,2) where x(n,k) is the data symbol received in subchannel n in burst k. The transmitted data is then recovered by obtaining the phase of x*(1,1)x(1,2). If the channel response at bin 1 is h(1), then the receiver effectively obtains:

$$x^*(1,1)x(1,2)=[h(1)z(1,1)]^*[h(1)z(1,2)]=z^*(1,1)h^*(1)h(1)z(1,2)=|h(1)|^2 z^*(1,1)z(1,2)$$

The phase of this expression communicates data and is unaffected by the channel response since the channel response is assumed to be substantially the same at the same frequency for two successive bursts or at adjacent frequencies within the same burst. Thus it is unnecessary to know the channel characteristics to accurately recover the transmitted data. (In a DAPSK application, further data would be obtained by amplitude ratios.)

This technique is particularly advantageous in certain applications. For example, where one is employing a sparse symbol constellation, e.g., 4-8 symbols, there is little or no increase in required signal to noise ratio due to unavailability of the magnitude component for communicating information. For four symbols, there is no increase in required signal to noise ratio. For eight symbols, there is some increase.

Even for denser constellations, the ability to communicate accurately without the use of training symbols may compensate for any increase in required signal to noise ratio. To accurately characterize the channel, at least v training symbols are required in a single burst where v is a duration of the channel impulse response. The training symbols have predetermined values and typically carry no data. Where channel impulse duration is a significant fraction of burst length, the loss of data carrying capacity to training becomes important. An example of this situation would be an OFDM system with severe phase noise carrying voice traffic across a dispersive fading channel. The system designer is forced to maintain a relatively short burst length to maintain low latency time and low sensitivity to phase noise, yet a large number of training symbols are necessary to repeatedly characterize the dispersive channel. The present invention offers a solution for this application by successfully communicating data without full channel knowledge.

In other applications, the collection of channel training information may be infeasible for other reasons. In a point to multipoint system, separate channels will exist between each of many remote transceivers and a central access point although the central access point will communicate with only one transceiver at a time. Each separate channel thus would be trained independently. The present invention may be applied here to free up capacity. The effect is the same for any system where access to a common transmission medium is shared.

Furthermore, shared access systems are often designed so that transceivers desiring access to the medium will first transmit one or more access request bursts. The central access point receiving an access request may not have recently received anything transmitted by the access point so any past training information would be too stale for use.

Differential OFDM with Multiple Receiver Antennas

Figure 1:
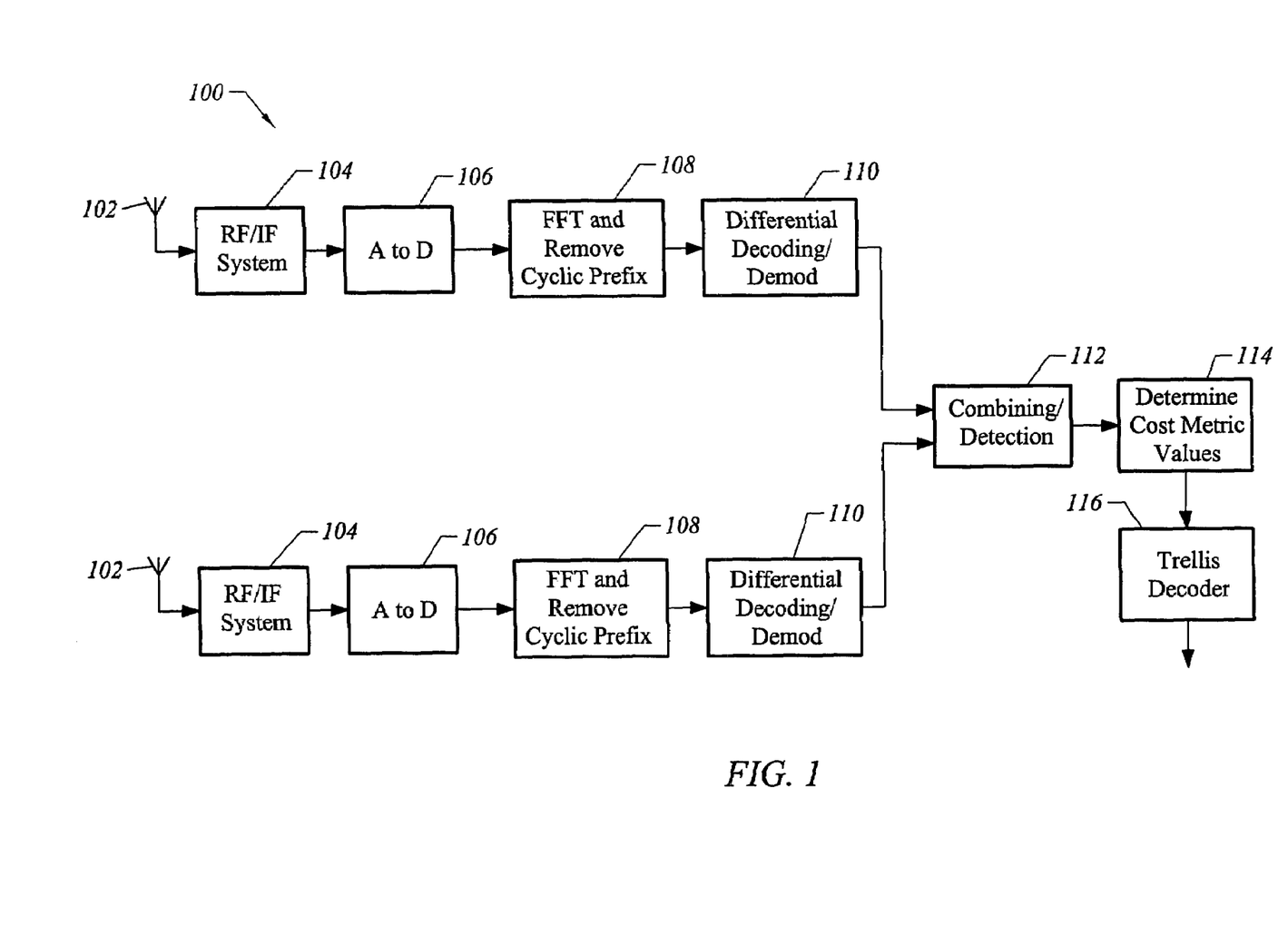
FIG. 1 depicts an OFDM receiver system employing multiple antennas according to one embodiment of the present invention.

FIG. 1 depicts an OFDM receiver system 100 employing multiple antennas according to one embodiment of the present invention. Receiver system 100 collects signals from a plurality of antennas 102. In FIG. 1, two antennas are shown, although any number of antennas may be used. Many components depicted in FIG. 1 are duplicated for each antenna.

Each antenna 102 is coupled to an RF/IF system 104 which performs initial analog filtering and amplification prior to downconversion to an intermediate frequency (IF) where further filtering and signal conditioning may be performed. The signal is then converted to baseband for input to an analog to digital converter 106. Alternatively, analog to digital conversion may occur at the IF. The next depicted stage is an FFT processor 108 that removes the cyclic prefix from N+v long time domain symbol bursts and then applies the FFT to recover N frequency domain symbols for each successive OFDM burst.

For each antenna 102, a differential decoding stage 110 recovers the differentially encoded data based on the frequency domain symbols output by the corresponding FFT processor 108. When data is encoded as phase differences between corresponding frequency domain symbols of successive bursts, each differential decoding stage 110 finds a detection symbol:

$$a_i(n,k)=x_i^*(n,k)x_i(n,k+1).$$

When differential data is encoded as phase differences between adjacent symbols, differential decoder 110 finds:

$$a_i(n,k)=x_i(n,k)x_i(n+1,k)$$

where x refers to a received frequency domain symbol, i identifies a particular antenna, n identifies a frequency domain symbol position within a burst, and k identifies a particular burst.

A combination element 112 combines the detection symbols obtained via the multiple antennas to form a combined detection symbol estimate. In one embodiment, combination element 112 finds the combined detection symbol to be:

$$a(n,k) = \sum_{i=1}^{M_R} a_i(n,k)$$

The recovered phase difference value is then:

$$\hat{z}(n,k)=\angle a(n,k).$$

In one embodiment, differential encoding/modulation is combined with channel coding techniques such as trellis coding or convolutional coding. It is advantageous to use a trellis decoder that requires soft decision or cost metric values as input. A cost metric value processor 114 calculates the cost metric values to be:

$$c(n,k)=|a(n,k)|^2|\hat{z}(n,k)-\bar{z}(n,k)|^2 \text{ where}$$

$\bar{z}(n,k)$ is the nearest ideal phase difference value to $\hat{z}(n,k)$. For example, the ideal phase difference values for QPSK would be $\{0, \pi/2, -\pi/2, \pi\}$.

The term $|a(n,k)|^2$ serves as a confidence value which weights phase differences received by the various antennas according to their associated symbol magnitudes. The cost metric values are then the input to a trellis decoder 116.

It may be advantageous to substitute a less complex Viterbi decoder for trellis decoder 116. A Viterbi decoder, however, requires cost metric values for individual bits rather than individual symbols. The process of developing bitwise cost metric values based on the phase difference data will be described in reference to FIGS. 2A-2B which depict a possible set of four ideal symbols 200 as would be output by differential decoding stages 110 in the absence of noise, interference, and channel distortion as well as a an actual received symbol 202

Figure 2A:
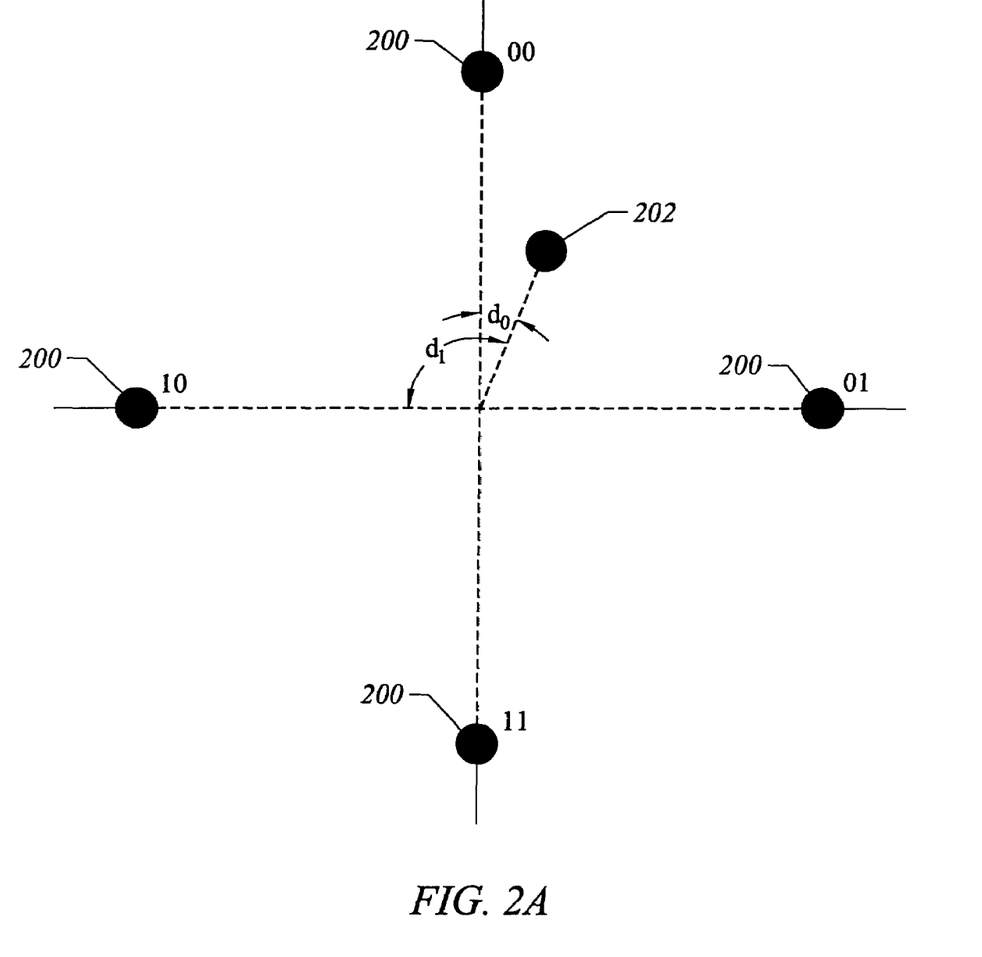
FIGS. 2A-2B are symbol constellation diagrams useful in describing development of bit-wise cost metric values for phase shift keying symbol sets.
Figure 2B:
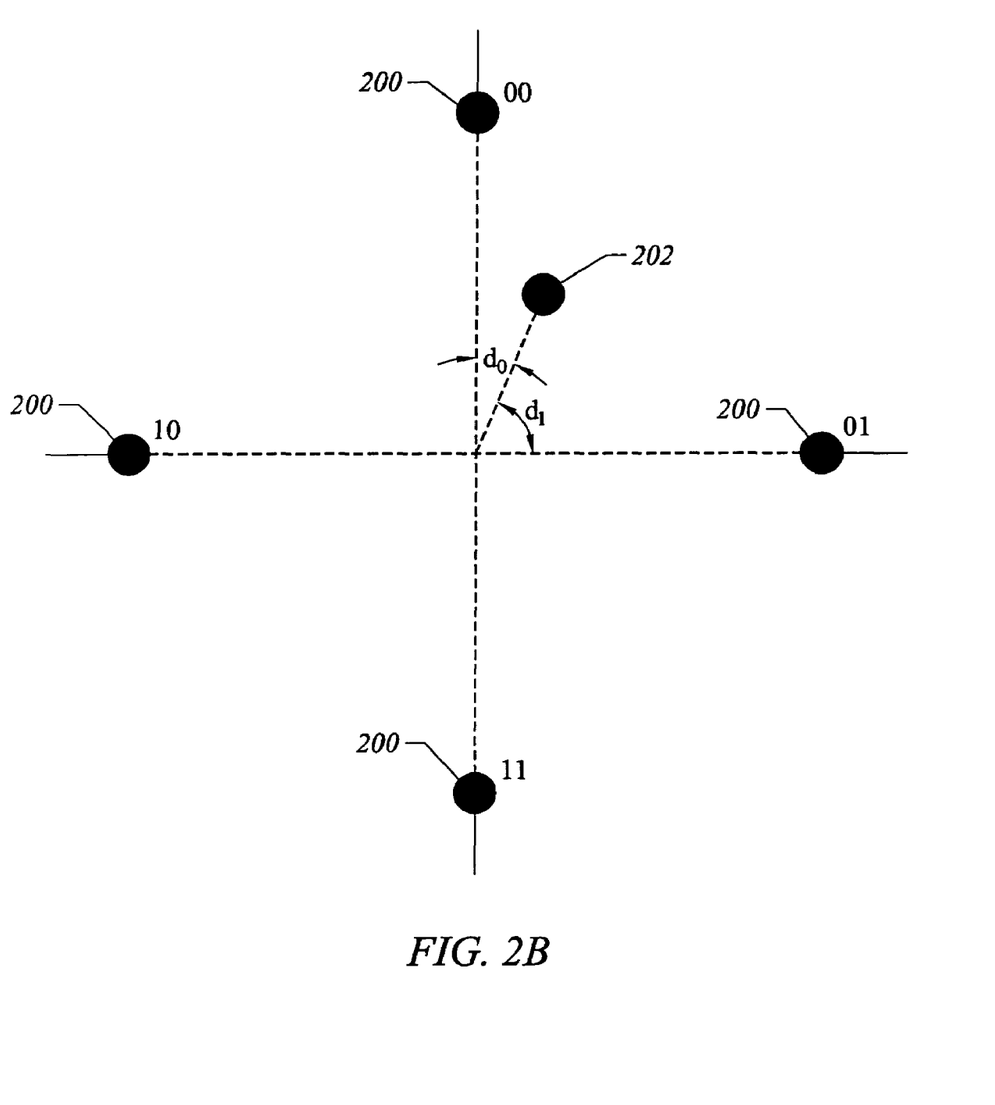

Ideal symbol set 200 assumes that the frequency domain symbols are chosen according to a differential quadrature phase shift key (DQPSK) scheme, although of course this scheme is merely representative. All four symbols have the same magnitude but different phases. Each symbol represents two bits as labeled. The cost metric values are given independently for each bit.

The cost metric value on a bit-wise basis may be given by:

$$c(n,k,m)=|a(n,k)|^2|d_0(n,k,m)-d_1(n,k,m)|^2\text{sign}[d_0-d_1]$$

where n identifies a frequency domain position, k identifies a burst number, and m identifies a particular bit position. The term $d_0(n,k,m)$ is the angular difference between the polar coordinates of the received symbol and the polar coordinates of the nearest (in angle) ideal symbol having a 0 at bit position m. Similarly, $d_1(n,k,m)$ is the angular difference between the polar coordinates of the received symbol and the polar coordinates of the nearest (in angle) ideal symbol having a 1 at bit position m. FIG. 2A depicts $d_0$ and $d_1$ for the most significant bit and FIG. 2B depicts these quantities for the least significant bit.

According to the present invention, one may also exploit differential coding in conjunction with frequency diversity rather than spatial diversity. Differential coding is applied to frequency domain symbols which are repeated within the frequency domain structure of an OFDM burst. Thus the frequency domain structure of the OFDM burst may include two or more repeated segments. At the receiver end, these repeated segments may be processed as if they had been received via multiple antennas as in the system of FIG. 1.

Figure 3:
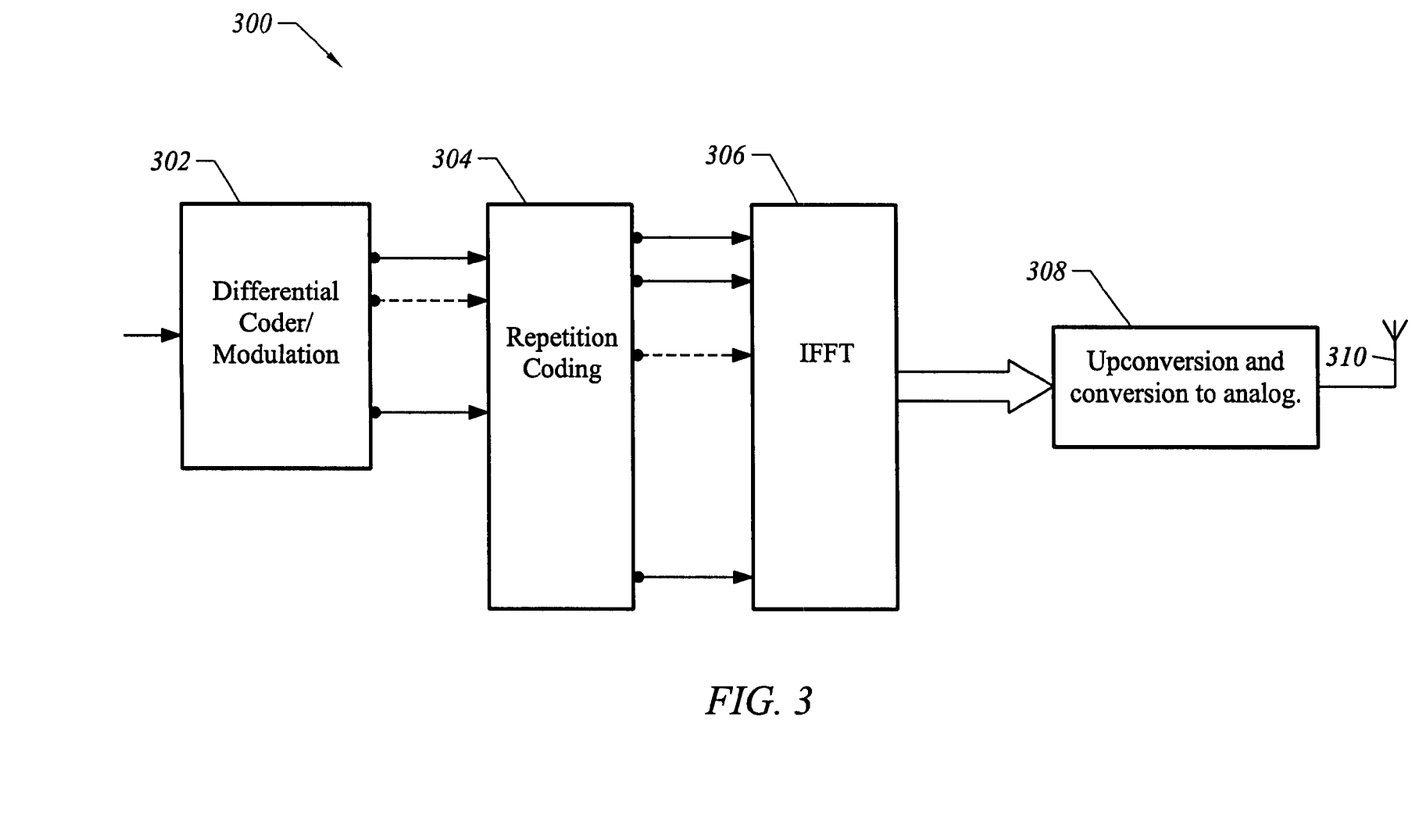
FIG. 3 depicts an OFDM transmitter system employing repetition coding according to one embodiment of the present invention.

FIG. 3 depicts an OFDM transmitter system 300 employing repetition coding according to one embodiment of the present invention. A differential coder 302 applies differential coding to an input data stream. The data may of course may be the output of other encoding processes. The output of differential coder 302 is a series of burst segments, each burst segment including OFDM frequency domain symbols. Differential coder 302 may, e.g., encode the data as phase differences between symbols adjacent in the frequency domain, or as phase differences between corresponding symbols in successively generated burst segments.

To implement repetition coding, each burst segment is repeated by a repetition coder 304 so that it fills the burst length used by transmitter system 300. The burst segment may be repeated twice, or 3 or more times. This provides frequency diversity. Of course, the frequency diversity typically comes at the expense of capacity. An IFFT processor 306 performs the IFFT on successive frequency domain bursts to obtain successive time domain bursts and adds a cyclic prefix to each time domain burst to assure orthogonalization. An RF/IF system 308 converts the baseband symbol stream to an IF analog signal and then to an RF signal ready for transmission via an antenna 310.

Figure 4:
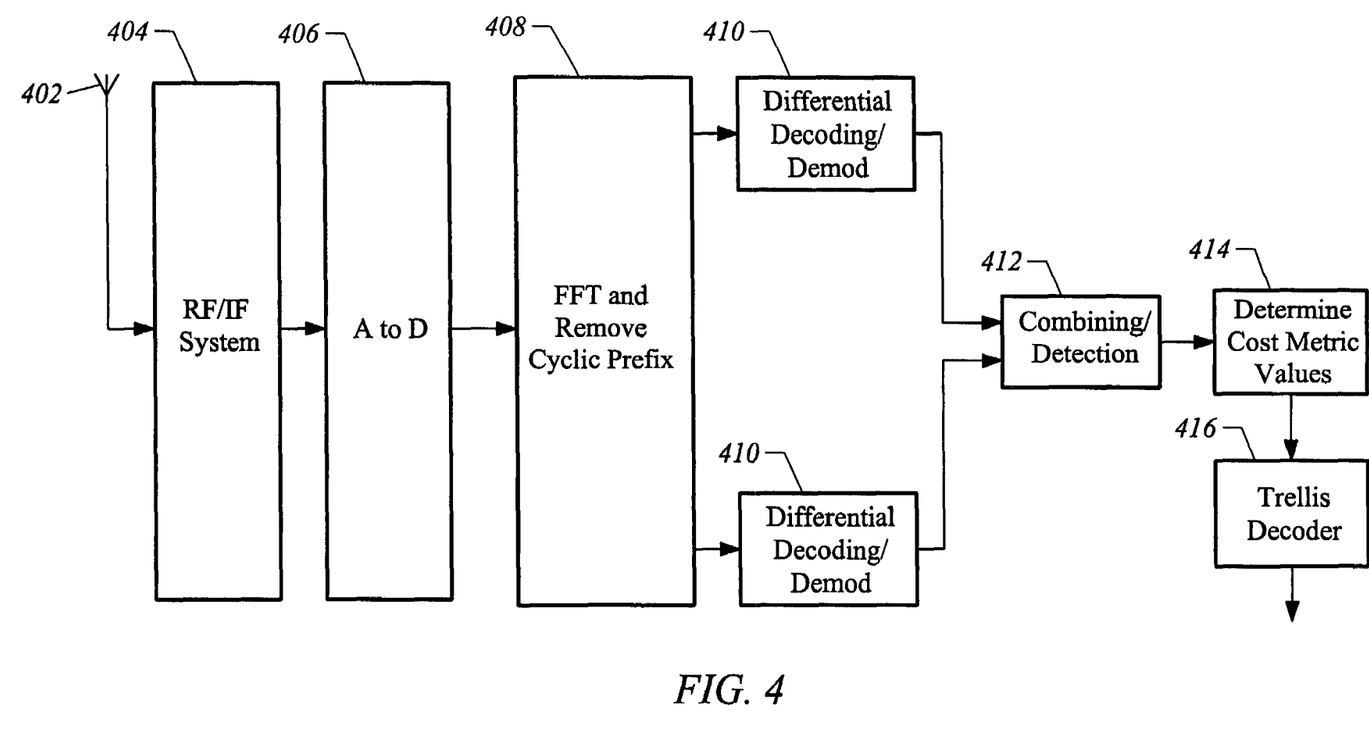
FIG. 4 depicts an OFDM receiver system employing repetition coding according to one embodiment of the present invention.

FIG. 4 depicts an OFDM receiver system 400 taking advantage of repetition coding according to one embodiment of the present invention. An antenna 402 is coupled to an RF/IF system 404 which performs initial analog filtering and amplification prior to downconversion to an intermediate frequency (IF) where further filtering and signal conditioning may be performed. The signal is then converted to baseband for input to an analog to digital converter 406. FFT processor 408 removes the cyclic prefix from N+v long time domain symbol bursts and then applies the FFT to recover N frequency domain symbols for each successive OFDM burst.

The output of FFT processor 408 is a series of frequency domain bursts. Each burst includes two or more repeated segments. The repeated segments may be combined in the same manner as the frequency domain symbols received via multiple antennas in FIG. 1. For each segment, there is a separate differential decoding stage 410. When data is encoded as phase differences between corresponding frequency domain symbols of successive bursts, differential decoding stage 410 finds:

$$a_i(n,k)=x_i^*(n,k)x_i(n,k+1).$$

When differential data is encoded/modulated as phase differences between adjacent symbols, each differential decoding stage 410 finds:

$$a_i(n,k)=x_i^*(n,k)x_i(n+1,k)$$

where x refers to a received frequency domain symbol, i identifies a particular segment rather than a particular antenna, n identifies a frequency domain symbol position within a burst, and k identifies a particular burst.

A combination element 412 then operates in the same way as combination element 112 to combine the phase difference values developed from different burst segments. A cost metric value processor 414 then develops soft cost metric values for input to a trellis decoder 416 using the techniques described in reference to cost metric value processor 114. The cost metric values may be developed on either a bit by bit or symbol by symbol basis.

Repetition coding may also be employed with multiple antennas to provide both frequency diversity and spatial diversity. The combination techniques are the same as described in reference to FIGS. 3-4.

It is understood that the examples and embodiments described herein are for illustrative purposes only and that various modifications or changes in light thereof will be suggested to persons skilled in the art and are to be included within the spirit and purview of this application and scope of the appended claims and their full scope of equivalents. For example, all formulas given above are merely representative of procedures that may be used. Antennas are merely representative of channel inputs and outputs and the present invention may also be applied to wireline systems. Functionality may be added or deleted from FIGS. 1 and 3-4 and operations may be interchanged among functional blocks. All publications, patents, and patent applications cited herein are hereby incorporated by reference.

The invention claimed is:

1. A method of operating a wireless receiver to obtain a soft decision value for a particular bit of a multibit phase shift key symbol, said method comprising:
   receiving one or more signals in a wireless receiver as a result of a transmission of a signal in which the multibit phase shift key symbol is encoded;
   forming a received estimate of said multibit phase shift key symbol from the received one or more signals;
   obtaining a first angular difference between polar coordinates of said received estimate and polar coordinates of a nearest in angle ideal symbol having zero as a value for said particular bit;
   obtaining a second angular difference between polar coordinates of said received estimate and polar coordinates of a nearest in angle ideal symbol having one as a value for said particular bit; and
   forming a soft decision value for said particular bit based on said first angular difference and said second angular difference.

2. The method of claim 1 wherein said soft decision value is formed further based on an amplitude of said received estimate, said amplitude acting as a confidence value.

3. The method of claim 1 wherein said phase shift key symbol comprises a detection symbol in a DPSK system.

4. A method of operating a wireless receiver for receiving differential encoded OFDM signals via multiple antennas to obtain a soft decision value for a particular bit of a multibit phase shift key symbol, said method comprising:
   receiving one or more differential encoded OFDM signals in the wireless receiver via the multiple antennas as a result of a transmission of a differential encoded OFDM signal in which the multibit phase shift key symbol is differentially encoded;
   forming a received estimate of said multibit phase shift key symbol from the received one or more signals; and
   forming a soft decision value for said particular bit based on angular differences between said received estimate and ideal values for said multibit phase shift key symbol.

5. An apparatus comprising:
   a receiver including multiple antennas, the receiver operative to receive differential encoded OFDM signals via the multiple antennas as a result of a transmission of a differential encoded OFDM signal in which the multibit phase shift key symbol is encoded;
   a symbol estimator operative to form a received estimate of said multibit phase shift key symbol from the received one or more signals;
   a soft decision processor coupled to the symbol estimator and operative to obtain for a particular bit of the multibit phase shift key symbol a first angular difference between polar coordinates of said received estimate and polar coordinates of a nearest in angle ideal symbol having zero as a value for said particular bit; to obtain for said particular bit a second angular difference between polar coordinates of said received estimate and polar coordinates of a nearest in angle ideal symbol having one as a value for said particular bit; and operative to form a soft decision value for said particular bit based on said first angular difference and said second angular difference; and
   a decoder coupled to the soft decision processor.

* * * * *

UNITED STATES PATENT AND TRADEMARK OFFICE
CERTIFICATE OF CORRECTION

| | |
|---|---|
| PATENT NO. | : 7,342,872 B1 |
| APPLICATION NO. | : 10/673958 |
| DATED | : March 11, 2008 |
| INVENTOR(S) | : Jones, IV et al. |

It is certified that error appears in the above-identified patent and that said Letters Patent is hereby corrected as shown below:

In column 3, line 60, kindly change "$7\pi/2$" to --$\pi/2$--.

Signed and Sealed this

Seventeenth Day of June, 2008

JON W. DUDAS
*Director of the United States Patent and Trademark Office*